(12) United States Patent
Chan

(10) Patent No.: US 6,330,026 B1
(45) Date of Patent: Dec. 11, 2001

(54) COLOR TESTING SYSTEM FOR TESTING COLOR OUTPUT OF A DISPLAY DEVICE

(75) Inventor: Jacky Chan, Penang (MY)

(73) Assignee: Acer Technologies Sdn. Bhd, Penang (MY)

(*) Notice: Subject to any disclaimer, the term of this patent is extended or adjusted under 35 U.S.C. 154(b) by 0 days.

(21) Appl. No.: 09/208,870

(22) Filed: Dec. 10, 1998

(51) Int. Cl.$^7$ .................................................. H04N 17/02

(52) U.S. Cl. .................. 348/180; 348/182; 348/191; 348/655

(58) Field of Search .................. 348/191, 180, 348/181, 182, 184, 190, 655; 345/150, 904, 145; H04N 17/02, 9/73

(56) References Cited

U.S. PATENT DOCUMENTS

| | | | |
|---|---|---|---|
| 5,298,993 | * 3/1994 | Edgar et al. | 348/180 |
| 5,311,294 | * 5/1994 | Cromer et al. | 348/180 |
| 5,483,259 | * 1/1996 | Sachs | 345/153 |
| 5,570,108 | * 10/1996 | McLaughlin et al. | 345/904 |
| 5,739,809 | * 4/1998 | McLaughlin et al. | 345/150 |
| 6,018,361 | * 1/2000 | Fujii et al. | 348/180 |
| 6,140,809 | * 10/2000 | Doi | 348/180 |

* cited by examiner

*Primary Examiner*—Reinhard J. Eisenzopf
*Assistant Examiner*—Jean W. Désir

(57) ABSTRACT

The present invention provides a color testing system for testing intensities of color output from a screen of a display device. The color testing system comprises a reading probe for reading color output from the screen of the display device, a display equipment, and a color analyzer connected to the reading probe for analyzing the intensities of the color output from the screen of the display device. When testing the display device, the color analyzer will display a screen graph and a cursor on the display equipment corresponding to a next testing area on the screen according to a predetermined test track. The screen graph and the cursor will direct an operator to move the reading probe on the screen of the display device so that the reading probe can properly read the color output of each testing area along the test track on the screen of the display device.

6 Claims, 3 Drawing Sheets

COLOR TESTING SYSTEM FOR TESTING COLOR OUTPUT OF A DISPLAY DEVICE

BACKGROUND OF THE INVENTION

1. Field of the Invention

The invention relates to a color testing system, and more particularly, to a color testing system for testing color output of a display device.

2. Description of the Prior Art

During the manufacturing process of color display devices, a color analyzer is used to test and calibrate intensity deviations of their color output.

A typical color analyzer has a reading probe with a round surface of 2-cm in diameter for receiving the color output. The most popular way to test color intensity deviations is having an operator manually move the reading probe across the screen area of the display device for the color analyzer to receive color output from the display device. There are two drawbacks in such testing operation. First, it is difficult for the operator to maintain the movement of the reading probe at a constant speed. Therefore, when the probe is performing periodical readings during movement, the same screen area may be read twice or a certain screen area may be inadvertently skipped thereby affecting the quality of test. Second, testing a 15-inch screen requires roughly 200 readings and is therefore very costly in terms of time and labor.

SUMMARY OF THE INVENTION

It is therefore a primary objective of the present invention to provide a color testing system for simplifying a color test process to solve the above mentioned problems.

Briefly, in a preferred embodiment, the present invention provides a color testing system for testing intensities of color output from a screen of a display device comprising:

a reading probe for reading color output from the screen of the display device;

a display equipment; and a color analyzer connected to the reading probe for analyzing the intensities of the color output from the screen of the display device; wherein when testing the display device, the color analyzer displays a screen graph and a cursor on the display equipment corresponding to a next testing area on the screen according to a predetermined test track, the cursor will direct an operator to move the reading probe on the screen so that the reading probe can properly read the color output of each testing area along the test track on the screen.

It is an advantage of the present invention that the color testing system can define a test track based on test results of a plurality of display devices of the same model so as to greatly reduce the number of testing areas required to test a display device without adversely affecting the detection of defective testing areas.

Another advantage of the present invention is that the moveable cursor is used to display the position of each next testing area so that the operator is directed to move the reading probe to correct testing positions at a suitable rate to read the color intensity output of each testing area on the screen of the display device.

These and other objects and the advantages of the present invention will no doubt become obvious to those of ordinary skill in the art after having read the following detailed description of the preferred embodiment that is illustrated in the various figures and drawings.

DETAILED DESCRIPTION OF THE PREFERRED EMBODIMENT

Figure 1:
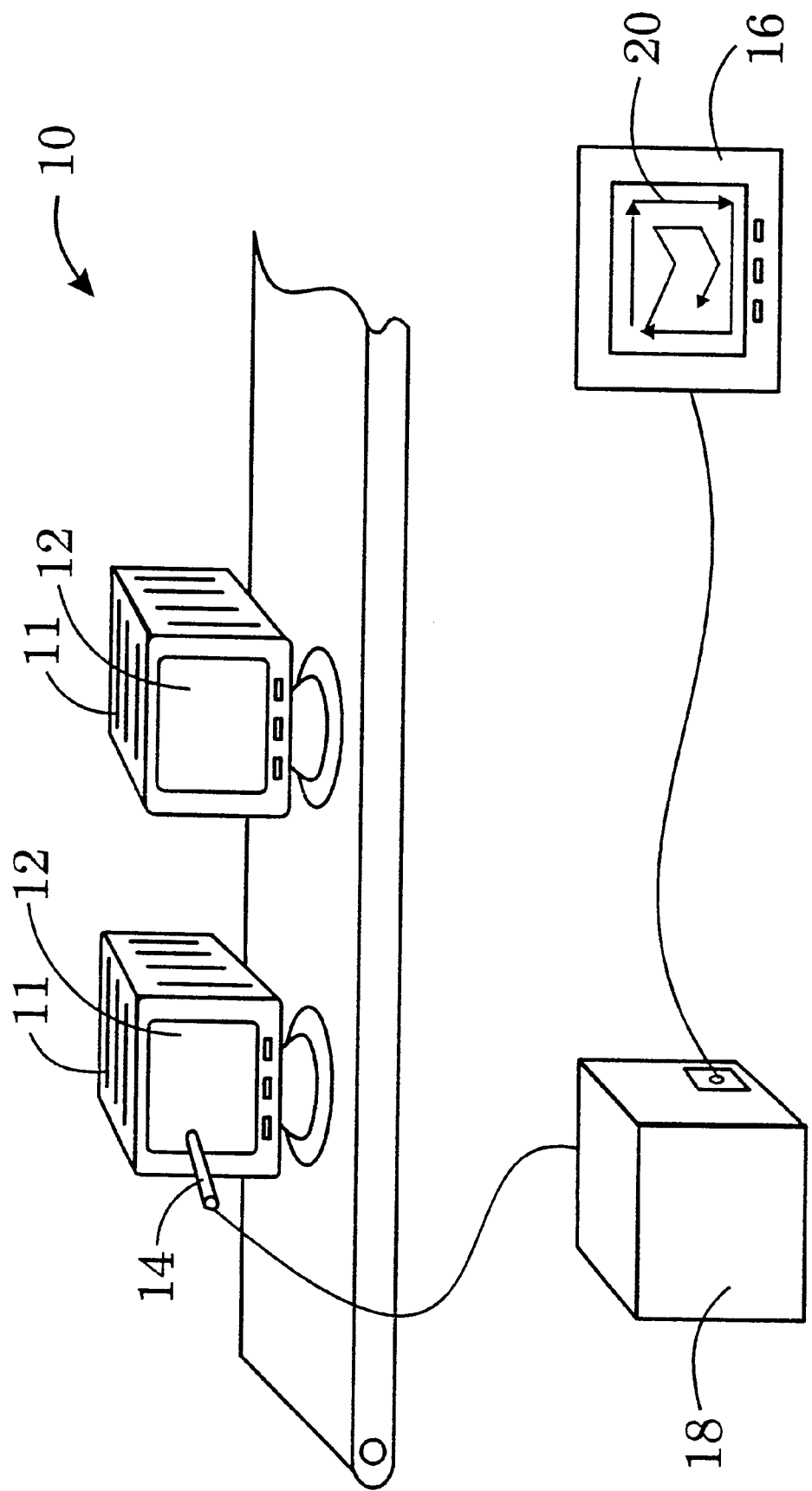
FIG. 1 is a perspective view of a color testing system according to the present invention.

Please refer to FIG. 1. FIG. 1 is a perspective view of a color testing system 10 according to the present invention. The color testing system 10 is used for testing color output of a screen 12 of a display device 11. It comprises a reading probe 14 for reading color output from the screen 12, a monitor 16, and a color analyzer 18 connected to the reading probe 14 for analyzing the output from the screen 12, and displaying test results on the monitor 16.

When testing the color output of the screen 12, the color analyzer 18 will display a static screen graph representing a predetermined test track 20 and a moving cursor corresponding to the next testing area on the test track 20 on the monitor 16. The test track 20 is obtained according to the following steps:

(1) divide the screen 12 into a plurality of equal sized testing areas, the size of each testing area is determined by the size of the reading probe 14;

(2) measure the color output of all testing areas of a plurality of display devices 11 of the same model;

(3) calculate the average value of each testing area according to the output of the plurality of display devices, and select a plurality of testing areas with the greatest and least average values; and (4) connect the selected testing areas according to a predetermined method to form the test track When the screen 12 is tested, a screen graph is shown on the monitor 16 to illustrate the test track 20. The color analyzer 18 will set the moving speed of the cursor on the screen of the monitor 16 according to the time needed for the reading probe 14 to read each of the color output. The operator can manually move the reading probe 14 according to the position of the cursor on the screen 12 so that the reading probe 14 can read the color output from the correct testing area on the screen 12 along the test track 20.

Figure 2:
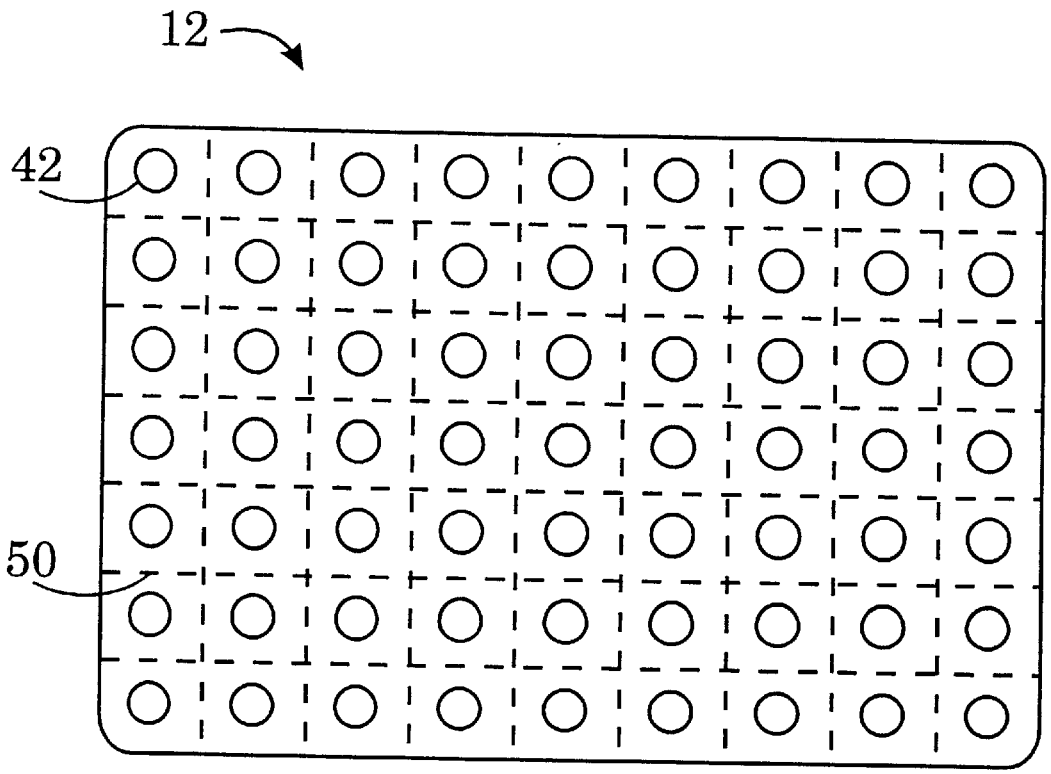
FIG. 2 is a perspective view of a screen of the display device in FIG. 1.
Figure 3:
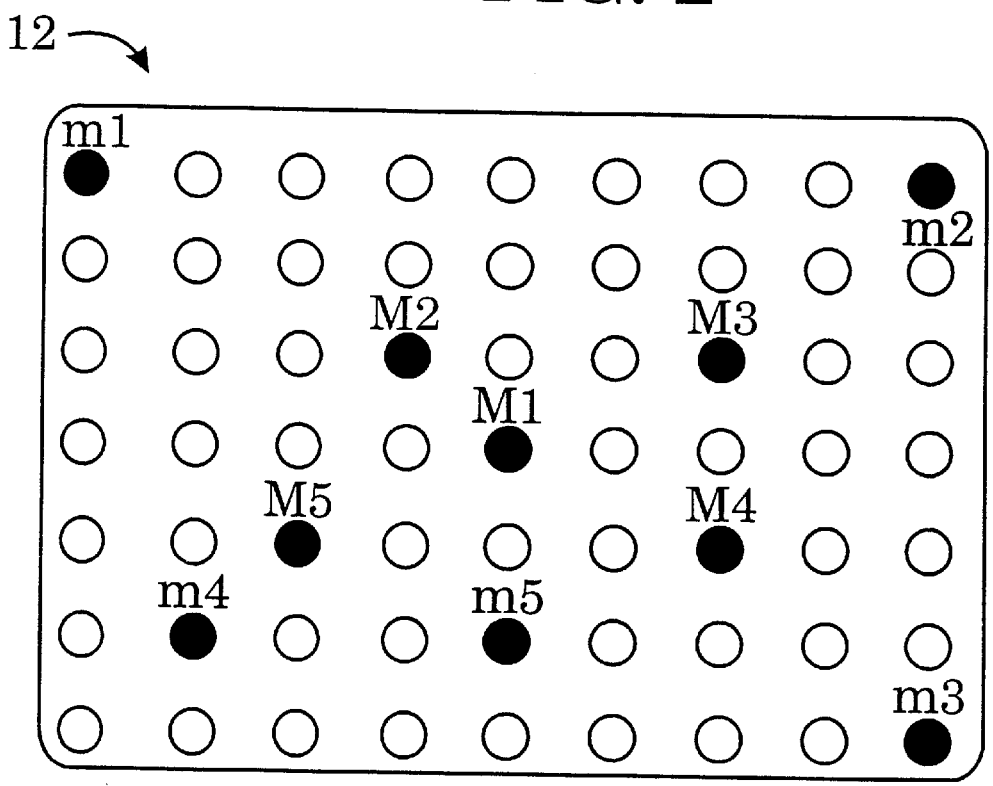
FIG. 3 shows ten areas with greatest color intensity deviations on the screen in FIG. 2.

Please refer to FIG. 2. FIG. 2 is a perspective view of the screen 12 of the display device 11 in FIG. 1. Using an 8-by-6 grid 50, the screen 12 is divided into 63 equal-sized testing areas 42. When determining the test track 20, the color analyzer will test 20 sets of display devices 11 of the same model to obtain the color output of all testing areas 42 of each screen 12. It will then calculate the average of the color output of each testing area 42 according to the obtained color output so as to select five testing areas with the greatest average values and five testing areas with the least average values as the ten selected testing areas 42 with extreme color intensity deviations. Please refer to FIG. 3. FIG. 3 shows ten selected testing areas with five having the greatest average values M1, M2, M3, M4, M5 and five having the least average values m1, m2, m3, m4, m5.

Figure 4:
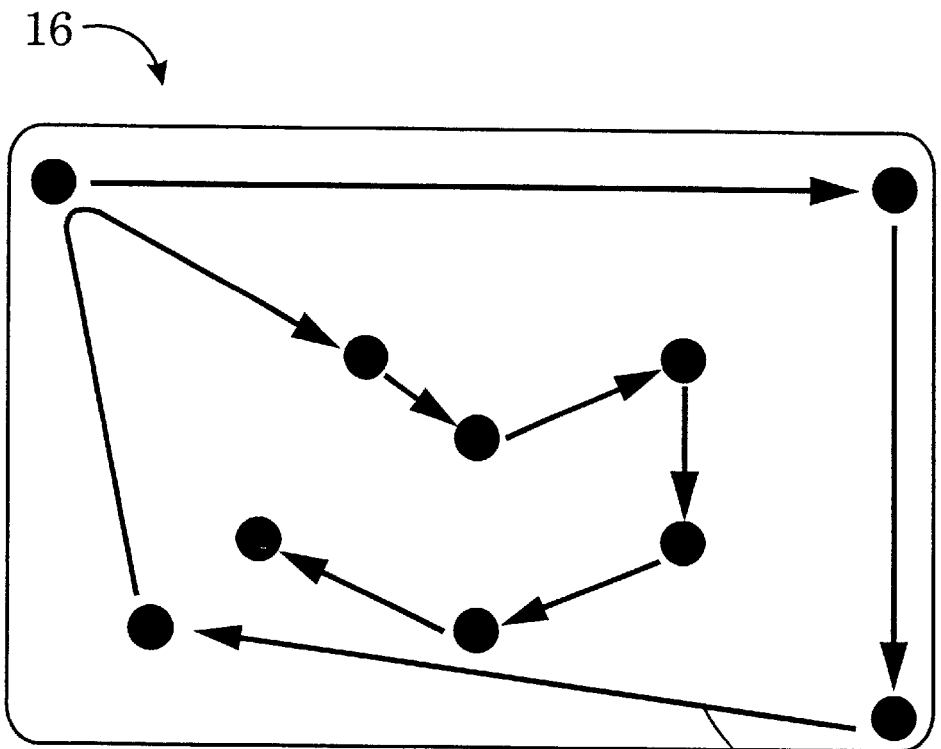
FIG. 4 is a test track on the display device in FIG. 1.

Please refer to FIG. 4. FIG. 4 are screen graphs of the test track 20 shown on the monitor 16. When the ten testing areas with extreme average values are identified, four of the testing areas m1, m2, m3, m4 closest to four corners of the screen 12 will be firstly connected to form a closed loop along the circumference of the screen 12 so as to enclose the center of the screen 12 at least once. The rest of selected testing areas will be connected to form a shortest route in a sequence M2, M1, M3, M4, m5 and M5 accordingly. During the color testing, the testing areas located on the test track 20 (including the above mentioned closed loop and shortest route) will be read.

Moreover, the distance between two consecutive readings of the reading probe 14 on the test track 20 will be adjusted according to an overall length of the test track 20 so as to maintain the number of readings on the test track 20 less than forty. Therefore, when there are more than forty testing areas located on the testing track 20, except the ten selected testing areas(M1~M5, m1~m5), some testing areas will be skipped without reading to increase the distance between two consecutive readings.

Figure 5:
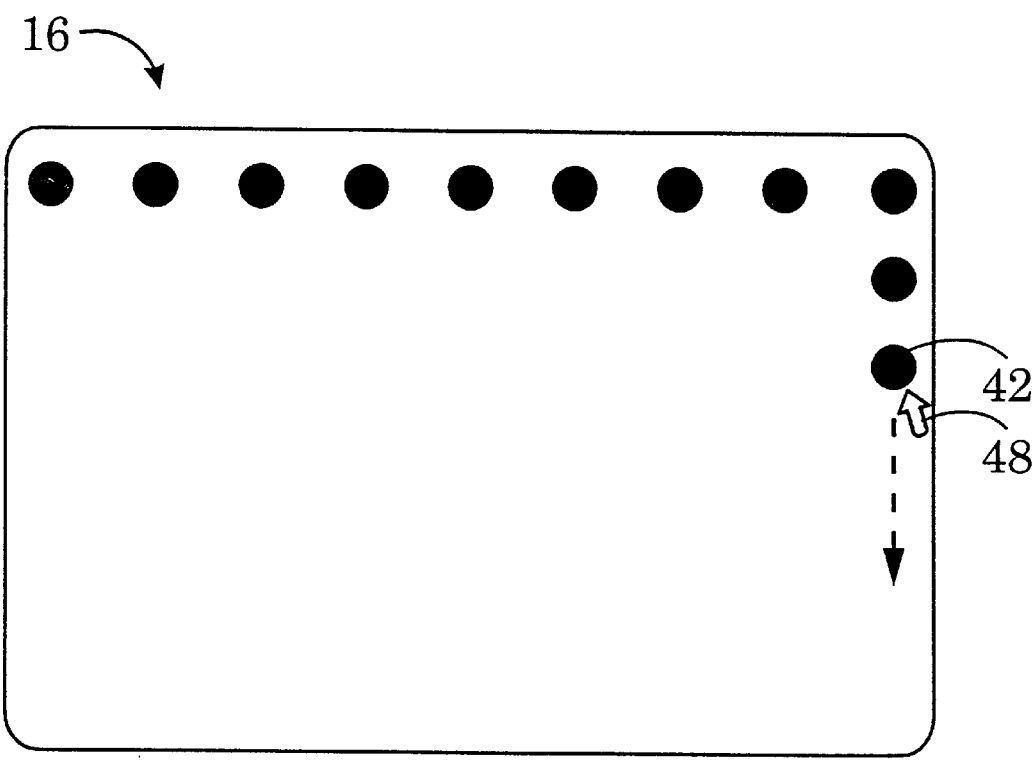
FIG. 5 is a perspective view of a moveable cursor along the test track in FIG. 4.

Please refer to FIG. 5. FIG. 5 is a perspective view of a moveable cursor 48 on the test track 20 in FIG. 4. In this embodiment, the screen graphs of the test track 20 form a background, and the moveable cursor 48 is moving on the screen of the monitor 16. Determined by the size and the reading speed of the reading probe 14, the color testing system 10 will show the moveable cursor 48 on the monitor 16 to notify the operator the next testing area 42 on the screen 12 so that the operator can move the reading probe 14 to the position of the next testing area 42 correctly.

Compared with the prior art, the present invention will detect areas with extreme color intensity deviations according to test results of a plurality of display devices 11, and define the test track 20 according to these areas so that the number of testing areas 42 to be tested is greatly reduced without adversely affecting the detection of the defective display devices. Furthermore, the color testing system 10 can use the moveable cursor 48 to display the position of the next testing area 42 on the monitor 16 based on the size and reading speed of the reading probe 14 so that the operator is guided to move the reading probe 14 to correct positions on the screen 12 for reading the color output from the correct testing areas.

Those skilled in the art will readily observe that numerous modifications and alterations of the propeller may be made while retaining the teachings of the invention. Accordingly, the above disclosure should be construed as limited only by the metes and bounds of the appended claims.

What is claimed is:

1. A color testing system for testing intensities of color output from a screen of a display device comprising:

a reading probe for reading color output from the screen of the display device;

a display equipment; and a color analyzer connected to the reading probe for analyzing the intensities of the color output from the screen of the display device;

wherein when testing the display device, the color analyzer displays a cursor on the display equipment corresponding to a next testing area on the screen according to a predetermined test track, the cursor will direct an operator to move the reading probe on the screen so that the reading probe can properly read the color output of each testing area along the test track on the screen.

2. The color testing system of claim 1 wherein the moving speed of the cursor on the display equipment is determined by the time needed for the reading probe to read a color output.

3. The color testing system of claim 1 wherein the predetermined test track is obtained according to following steps:

(1) dividing the screen of the display device into a plurality of testing areas;

(2) measuring the color output of all testing areas of a plurality of display devices of the same model;

(3) calculating the average of the color output of each testing area according to the measurement, and selecting a plurality of testing areas with the greatest and least average values; and (4) connecting the selected testing areas according to a predetermined method to form the test track.

4. The color testing system of claim 3 wherein a distance between two consecutive readings of the reading probe on the test track will be adjusted according to an overall length of the test track so as to maintain the number of readings on the test track within a predetermined number.

5. The color testing system of claim 3 wherein the size of each testing area is set according to the reading area of the reading probe.

6. The color testing system of claim 3 wherein the predetermined method to form the test track is firstly connecting four selected testing areas closest to four corners of the screen to form a closed loop, and then connecting the rest of the selected testing areas to form a shortest connecting distance route.

* * * * *